3,423,246
LEAKPROOF ELECTRODE
Manfred J. Prager and Hugh H. Horowitz, Elizabeth, N.J., assignors to Esso Research and Engineering Company, a corporation of Delaware
No Drawing. Filed Jan. 6, 1964, Ser. No. 336,049
U.S. Cl. 136—120     8 Claims
Int. Cl. H01m 27/04

This invention relates to a new and improved electrode for use in electrochemical and fuel cells. In particular, this invention relates to a particular composition of an electrode for use in the fuel cell. More particularly, this invention relates to an electrode for use in a fuel cell employing a fuel which would be immiscible in an aqueous electrolyte.

Heretofore in the art, fuel cells employing a fuel which was immiscible in the electrolyte had been constructed so that the electrode acted as a barrier between the electrolyte and the fuel. The electrode was porous allowing for the electrolyte and the fuel to penetrate the electrode and form the three-phase contact within the electrode, that is, it allows for the fuel, electrolyte and electrode to come into contact at one point. One of the problems facing the early art was that the electrolyte tended to flood the electrode thereby reducing the area at which the fuel, electrolyte and electrode come into contact. Various methods were attempted in order to improve the efficiency of the electrode by excluding the flooding of the electrolyte. The primary method was to waterproof the electrode. This was done by adding waterproofing agents to nonwaterproof electrodes or by constructing the electrode out of waterproof materials such as tetrafluoroethylene (Teflon). These Teflon electrodes are made in various manners although the most common method available to the art was to mix an electrically conductive material and catalyst with Teflon, press it into a desired shape and then heat sinter the structure. This made a very waterproof electrode. However, when a liquid carbonaceous fuel is used in such a cell it tends to flood the electrode due to preferential wetting thereby excluding the electrolyte, insulating part of the catalyst and reducing the area of three-phase contact which reduces the efficiency of the electrode.

Methods were tried to increase the efficiency of the Teflon electrodes. One of the methods tried was that of varying the pressure at which the Teflon and conductive material catalyst was pressed into shape. However, it was found that if a sufficient pressure were not used that the eletcrode would leak very badly and if extensive pressure were used that the electrode had very little porosity after sintering.

It has now been found that contrary to what is generally believed, that is that the electrodes must be made more and more waterproof, that if the hydrophobicity of the electrode were controlled so that the contact angle of the water with the electrode was between about 80 and 120° rather than above about 160°, the efficiency of the electrode would be increased. In view of this unexpected finding, it has now been found that efficient electrodes can be made by mixing a highly hydrophobic material such as tetrafluoroethylene and a less hydrophobic material such as a copolymer of acrylonitrile and vinyl chloride with a finely divided catalyst and then pressing the mixture onto an electrically conductive screen. By using a mixture of highly hydrophobic material with a less hydrophobic material, in fact, one that is somewhat hydrophilic, it is possible to make an electrode which is far superior to an electrode made with either of the component parts. Heretofore, it was believed that if the hydrophobicity of the electrode were reduced that it would tend to flood thereby decreasing the efficiency of the electrode. However, the present electrodes, contrary to what was expected, actually have an increased efficiency.

By the method of the instant invention, an electrode is prepared by mixing a catalytic electrically conductive material or an electrically conductive material impregnated with catalyst with a mixture of two synthetic materials one of which is highly hydrophobic and the other which is less hydrophobic. This mixture is intimately mixed, for example, in a ball mill, and then pressed into shape. The soft powdered mixture is, in general, spread over a conductive supporting matrix such as a fine metal screen or a sintered metal plate or a porous carbon plate or the like. The structure is then cold pressed, cold pressed and sintered at the plastic sintering temperature or hot pressed. The porous structure can then be further impregnated with catalyst if desired or if the original electrically conductive material were not catalytically impregnated, it can be catalytically impregnated at this step by saturating the porous structure with a solution of a catalyst salt and thereafter reducing the catalyst salt within the pores of the structure to the free catalyst.

The electrodes made by the instant invention can be used in any of the existing fuel cells which operate at temperatures at which the electrode would be stable. For instance, if an electrode were used comprising a mixture of tetrafluoroethylene and a copolymer of acrylonitrile and vinyl chloride, the electrochemical cell or fuel cell would have to be operated at a temperature below 150° C. By varying the components of the synthetic binder material to be used in this invention, electrodes can be prepared which are stable at higher temperatures and therefore may be used in fuel cells which operate at higher temperatures.

The electrodes in the instant invention were designed primarily for use with fuel cells utilizing a liquid fuel which is immiscible with a liquid electrolyte. However, the electrodes will work quite efficiently with cells employing a fuel which is miscible with the electrolyte such as methyl alcohol or ethyl alcohol.

The catalytic materials which may be used with this invention are any of the known catalysts for use in anodically oxidizing a fuel at the anode or cathodically reducing the oxidant at the cathode of a fuel cell. Fuels which may be used in the practice of this invention include the hydrocarbons, both saturated and unsaturated hydrocarbons which are liquid at the temperature at which the cell operates and oxygenated hydrocarbons such as alcohols, ketones and ethers which are liquid or gaseous at the temperature which the cell operates. Examples of fuels which can be used in the practice of this invention include methyl alcohol, decane, benzene, dodecane, heptane, heptene, isooctane, decene, pentene, decyl alcohol and tridecyl alcohol. Oxidants such as oxygen, air and oxygen-containing gases may be used at the cathode.

In the combination of the binder materials there may be used as the hydrophobic materials, halogenated hydrocarbon polymers such as tetrafluoroethylene polymers, hexafluoroethylene polymers, fluoroethylene-propylene polymer, chlorotrifluoroethylene polymer, polyvinylidene fluoride and chlorinated ether polymers. As the less hydrophobic or hydrophilic material, there can be used compounds such as polyacrylonitrile, copolymers of acrylonitrile and vinyl chloride, ion-exchange materials such as polystyrene nuclear sulfonic acid, polystyrene trimethylbenzyl ammonium, polystyrene trimethylbenzyl ammonium polymer and polystyrene polyamine polymers. The preferred combination of hydrophobic and less hydrophobic material is a combination of tetrafluoroethylene and the copolymer of acrylonitrile and vinyl chloride.

The ratio of hydrophobic to less hydrophobic material is in the range of 1:3 to 3:1. Preferably, the range is a ratio of about 1:1 of hydrophobic to less hydrophobic material.

In formulating the electrodes of this invention, the ratio of binder, that is, the mixture of hydrophobic and less hydrophobic material with the catalytic material or the conductive material impregnated with catalyst is in the ratio of catalyst to binder of about 5:1 to 1:5, preferably 1:1.

The following examples are offered for the purpose of particularly pointing out the invention and are not to be construed as limitations upon the scope of the invention as set forth in the appended claims.

EXAMPLE 1

Four electrodes were prepared in order to show the increased efficiency of electrodes of the instant invention. Electrodes were prepared substantially in the same manner and tested in a fuel cell operated at 100° C. employing 3 molar sulfuric acid as the electrolyte and n-decane as the fuel. All four of the electrodes were prepared by mixing 250 mg. of binder with 250 mg. of finely divided platinum. The mixture was intimately combined in a ball mill and then one half of it was pressed into a 6 cm.$^2$ section of 52 mesh platinum screen at about 1500 p.s.i.g. Each of the electrodes were then tested as the anode in the fuel cell described above. The binder in each of the electrodes is set forth in Table I.

TABLE I

| Binder | Ma./cm.$^2$ at indicated polarization | | |
|---|---|---|---|
| | 0.4 | 0.5 | 0.6 |
| Tetrafluoroethylene polymer | 3.3 | 9.5 | 13.5 |
| Polyacrylonitrile | 7.4 | 10.5 | 13 |
| Acrylonitrile vinyl chloride copolymer | 2.7 | 5.6 | 7.3 |
| 50-50 ratio of a mixture of tetrafluoroethylene and the copolymer of acrylonitrile and vinyl chloride | 10 | 16.5 | 20.5 |

It can be seen from the table that the electrode of this invention, that is, the mixture component binder, is superior to electrodes known to the prior art and containing only a single binder.

EXAMPLE 2

Three electrodes made in accordance with this invention were prepared to test the stability of the electrodes in phosphoric acid. Each of the electrodes was run as the anode in a cell employing 85 wt. percent phosphoric acid as the electrolyte, n-decane was the fuel and the cell was operated at about 145° C. The cells were made as follows:

(a) A 50-50 mixture of tetrafluoroethylene polymer and polystyrene nuclear sulfonic acid resin were intimately mixed with finely divided platinum and pressed onto a 52 mesh platinum screen, (b) A 50-50 mixture of tetrafluoroethylene and a copolymer of acrylonitrile and vinyl chloride was intimately mixed with finely divided platinum and pressed onto a 52 mesh platinum screen, and (c) Finely divided platinum was intimately mixed separately with equal portions of tetrafluoroethylene polymer and a polystyrene nuclear sulfonic acid resin. The two mixtures, i.e. platinum-polymer and platinum-resin, were intimately mixed and pressed onto a 52 mesh platinum screen.

The electrodes were found to operate efficiently over a wide range up to about 41 ma./cm.$^2$ at a polarization of about 0.6 volt. The experiment showed that the electrodes of this invention will operate efficiently in phosphoric acid.

What is claimed is:

1. An electrode of controlled hydrophobicity consisting essentially of an intimate mixture of finely divided catalytic material and binder material pressed onto an electrically conductive support, said binder material consisting essentially of a mixture of a highly hydrophobic halogenated hydrocarbon polymer and a less hydrophobic polymeric organic synthetic binder.

2. An electrode as defined by claim 1 wherein said less hydrophobic polymeric synthetic binder is a copolymer of acrylonitrile and vinyl chloride.

3. An electrode as defined by claim 1 wherein the ratio of said catalytic material to said binder material is in the range of about 5:1 to 1:5.

4. An electrode as defined by claim 1 wherein the ratio of said highly hydrophobic halogenated hydrocarbon polymer to said less hydrophobic polymeric synthetic binder is in the range of about 1:3 to 3:1.

5. In combination with a fuel cell employing an aqueous electrolyte and a fuel immiscible in said electrolyte the electrode as defined by claim 1.

6. An electrode of controlled hydrophobicity for use in an electrochemical cell, said electrode comprising an intimate mixture of about equal proportions of finely divided platinum and binder material consisting of about equal proportions of tetrafluoroethylene polymer and copolymer of acrylonitrile and vinyl chloride, said intimate mixture being pressed onto a platinum screen.

7. An electrode as defined by claim 1 wherein said halogenated hydrocarbon is tetrafluoroethylene.

8. An electrode as defined by claim 1 wherein said less hydrophobic polymeric synthetic binder is selected from the group consisting of polyacrylonitrile, copolymers of acrylonitrile and vinyl chloride and ion-exchange materials.

References Cited

UNITED STATES PATENTS

| | | | |
|---|---|---|---|
| 3,297,490 | 1/1967 | Barber et al. | 136—122 |
| 3,328,205 | 6/1967 | Barber et al. | 136—120 X |
| 3,346,421 | 10/1967 | Thompson et al. | 136—120 |
| 3,348,974 | 10/1967 | Barber et al. | 136—86 |
| 3,215,562 | 11/1965 | Hindin | 136—120 X |
| 3,097,116 | 7/1963 | Moos | 136—86 X |
| 3,234,050 | 2/1966 | Beltzer et al. | 136—86 |
| 3,248,267 | 4/1966 | Langer et al. | 136—86 |
| 2,924,634 | 2/1960 | Fischbach et al. | 136—86 |

OTHER REFERENCES

Stein et al.: Second Status Report on Fuel Cells, Army Research Office, Report No. 2, December 1960, p. 36 relied on.

WINSTON A. DOUGLAS, *Primary Examiner.*

O. CRUTCHFIELD, *Assistant Examiner.*